Figure 1:
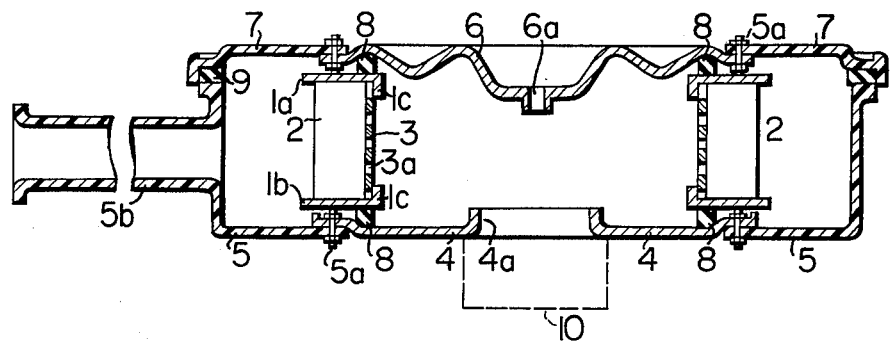

United States Patent [19]
Konishi et al.

[11] 3,877,910
[45] Apr. 15, 1975

[54] AIR CLEANER
[75] Inventors: Masami Konishi; Kenji Hikita, both of Toyohashi, Japan
[73] Assignees: Nippondenso Co., Ltd., Kariya-shi; Toyota Jidosha Kogyo Kabushiki Kaisha, Toyota-shi, both of Japan
[22] Filed: Sept. 15, 1972
[21] Appl. No.: 289,741

[30] Foreign Application Priority Data
Oct. 14, 1971 Japan................................ 46-94865

[52] U.S. Cl............... 55/502; 55/510; 55/DIG. 28
[51] Int. Cl............................................ B01d 46/40
[58] Field of Search ...... 55/510, 276, 503, DIG. 28, 55/502, 511

[56] References Cited
UNITED STATES PATENTS
| 3,272,192 | 9/1966 | Jensen et al. | 55/503 X |
| 3,355,863 | 12/1967 | Pittsley | 55/276 |
| 3,413,780 | 12/1968 | Amlott et al. | 55/276 |
| 3,563,009 | 2/1971 | Wheatley et al. | 55/510 |
| 3,563,010 | 2/1971 | Wheatley | 55/510 |
| 3,591,945 | 7/1971 | Eisel | 55/510 X |
| 3,617,149 | 11/1971 | Gibson | 55/DIG. 28 |

FOREIGN PATENTS OR APPLICATIONS
1,096,760  1/1961  Germany .............................. 55/503

Primary Examiner—Frank W. Lutter
Assistant Examiner—Kathleen J. Prunner
Attorney, Agent, or Firm—Cushman, Darby & Cushman

[57] ABSTRACT

An air cleaner with a frangible outer casing comprises a brittle, frangible outer casing and a rigid, more crash-durable inner casing. The upper and lower outer air cleaner casings are made of thermoplastic material and mounted to the rigid, more crash-durable inner air cleaner casing and the cap thereof so that the outer casing may be collapsed when the automobile collides with another automobile and the air cleaner is struck by other elements within the engine compartment. The fuel leaking out of the float chamber of the carburetor is absorbed by the air cleaning air filter element mounted to the inside of the inner casing.

6 Claims, 2 Drawing Figures

PATENTED APR 15 1975  3,877,910 upper outer air cleaner casing 7 from making a noise by hitting the lower outer air cleaner casing 5 or being broken, and is provided between the upper end of the tubular, outer peripheral wall of the lower outer air cleaner casing 5 and the upper outer air cleaner casing end wall 7 to avoid direct contact of the upper outer air cleaner casing 7 with the lower outer air cleaner casing 5 and absorb the vibration of one of the casings relative to the other caused by the vibrations of the engine and vehicle body for thereby preventing any shock which otherwise would be caused between the casings and damage the less crash-durable outer casing 7. The carburetor 10, including a float chamber containing gasoline, is provided on the air outlet 4a side.

In operation of the air cleaner in accordance with the present invention constructed as described hereinabove, the air flowing thereinto through the air inlet 5b passes through the air cleaning filter element 2 at the time of normal operation or driving of the automobile and the cleaned air passing through the air filter element 2 is sent to the carburetor 10 by way of the air outlet 4a. At the time of collision of the automobile carrying the air cleaner, the air cleaner collides with other parts in the engine compartment, such as a part of the engine or other parts arranged around the engine. By the impact exerted on the air cleaner, the air inlet 5b made of thermoplastic resin, the lower outer air cleaner casing end wall 5, the peripheral wall extending therefrom, and the upper outer air cleaner casing end wall 7, all made of collapsible, frangible material are all instantaneously broken and the impact is absorbed thereby. On the other hand, the cap 6, the lower inner air cleaner casing end wall 4 and the air cleaning filter element 2 are not deformed because the impact is absorbed by said outer casing and the inner casing is made of rigid more crash-durable material. The filter packings 8 maintain the air tightness between the upper end plate 1a and the cap 6 and between the lower end plate 1b and the lower inner air cleaner casing wall 4 to prevent the gasoline leaked from the float chamber of the carburetor 10 and flowing into the inner casing from leaking therefrom. Almost all the fuel flowing into the inner casing is absorbed by the filter element 2 and the rest is trapped in an annular recess formed in the inner surface of the cap 6, in an annular pocket defined by cooperation of the cap, the packing 8 and the upper plate 1a and in any other recess, pocket and corners formed inside the inner casing, and accordingly, the fuel is completely prevented from leaking out of the air cleaner casing. Thus, burning of the automobile is safely prevented.

Further, if the lower outer air cleaner casing 5 and lower inner air cleaner casing wall 4, and the upper outer air cleaner casing wall 7 and the cap 6 are respectively fixed by means of the bolts and nuts 5a as shown in FIG. 1, the broken upper and lower outer air cleaner casing parts 7 and 5 can be easily replaced by use of the bolts and nuts 5a. Thus, it is possible to facilitate the replacement of the outer air cleaner casing after crash servicing or maintenance in the first embodiment as shown in FIG. 1.

Although the upper air cleaner casing wall 7 and the lower outer air cleaner casing 5 are made of thermoplastic resin in the above described first embodiment, it should be noted that the upper outer air cleaner casing wall 7 may be made of rigid, more crash-durable material integrally fixed to said cap 6 and the lower outer air cleaner casing 5 may also be made of rigid more crash-durable material integrally formed with said lower inner air cleaner casing wall 4. In such a case, only the air inlet tube 5b is made of thermoplastic resin so as to be collapsed instantaneously at the time of collision of the automobile and absorb the impact.

Furthermore, though it is not shown in the drawing, it is possible to form the upper outer air cleaner casing wall 7 and the lower outer air cleaner casing 5 with thermoplastic material so as to be collapsed at the time of collision of the automobile and form the cap 6 and the lower inner air cleaner casing wall 4 with iron plate and form the air inlet tube 5b with rigid material as iron plate so that the impact at the time of collision may be absorbed by the upper outer air cleaner casing wall 7 and the lower outer air cleaner casing 5.

In addition, although in the above described first embodiment shown in FIG. 1 the lower outer air cleaner casing 5 and the lower inner air cleaner casing wall 4 are fixed together with a bolt and nut 5a as well as the upper outer air cleaner casing wall 7 and the cap 6, it is possible to make the rigid material as the iron plate so as to be inserted into the thermoplastic resinous plate by a resilient coupling mechanism.

Figure 2:
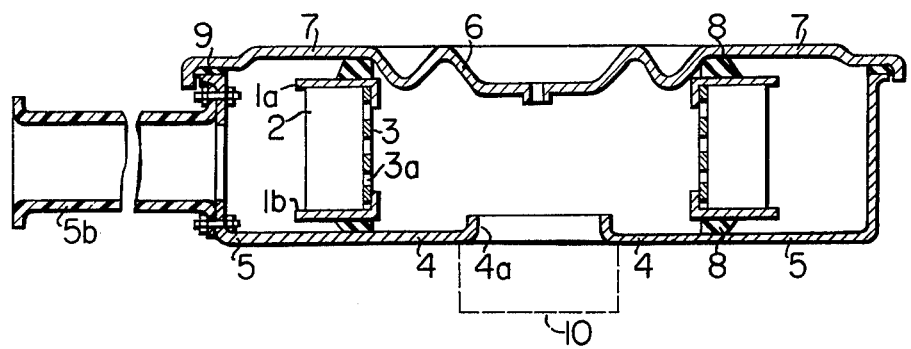

Further, in the above described embodiments shown in FIGS. 1 and 2, part of the gasoline leaking out of the float chamber of the carburetor 10 is stored within a tight chamber enclosed by the cap 6 and the lower inner air cleaner casing wall 4 and the filter element 2, and the rest of the gasoline is prevented from leaking out by the filter element 2 which absorbs the gasoline. It is accordingly preferred to make the filter element 2 with a material which does not so much increase the resistance to the air flow therethrough and well absorbs the gasoline leaking out of the float chamber of the carburetor 10 such as felt, unwoven cloth, active carbon and the like in order to more effectively prevent burning of the automobile.

What is claimed is:

1. An automotive air cleaner, comprising:

an inner casing including an upper end wall, a lower end wall, a tubular outer peripheral wall extending between said end walls, and sealing means between each end wall and the peripheral wall;

means defining an air outlet opening through the lower end wall;

means defining a plurality of openings through the outer peripheral wall for the passage of air into the inner casing;

a tubular air cleaning filter element coaxially juxtaposed with the outer peripheral wall and covering said plurality of openings, whereby air entering through said plurality of openings is filtered before it can leave the inner casing via said air outlet opening;

an annular outer casing including an upper end wall, a lower end wall and an outer peripheral wall, the outer casing peripherally surrounding the outer peripheral wall of the inner casing;

means securing the outer casing to the inner casing to unite the air cleaner;

means defining an air inlet opening into the outer casing, the air inlet opening means including a tubular neck extending outwardly from the outer peripheral wall of the outer casing, whereby air may enter the outer casing through the air inlet opening,

AIR CLEANER

This invention relates to an air cleaner for automobiles, and more particularly to an air cleaner in which the air cleaning filter element is protected at the time of collision of the automobile.

In the conventional air filter for automobiles, the air filter casing and the air inlet tube and the like have been wholly made of iron plate or synthetic plastic resin. In the case that the air filter casing and the like are made of iron plate material, the air filter collides with some parts in the engine compartment when the automobile collides with other vehicles or the like and the casing and the air inlet tube are distorted or deformed by the impact. Thus, the air cleaning filter element within the air filter casing is deformed and the position of the filter element is changed, and accordingly the air-tightness of the casing is deteriorated and the fuel within the float chamber of the carburetor flows into the engine compartment through the air cleaner casing, which results in burning of the automobile. In the case that the air filter casing and the like are made of synthetic plastic resin, the air cleaner casing and the air inlet tube are instantaneously broken at the time of collision of the automobile and the air cleaning filter element and the like are scattered within the engine compartment. Therefore, in this case also, the fuel in the float chamber of the carburetor flows into the engine compartment and the burning of the automobile is brought about.

The primary object of the present invention is to provide an air cleaner for automobiles wherein the filter element is not deformed or broken at the time of collision of the automobile.

Another object of the present invention is to provide an air cleaner for automobiles wherein the outer part of the casing thereof is frangible at the time of collision so as not to deform or break the filter element provided therein, thereby preventing the burning of the automobile at the time of collision.

In order to accomplish the above mentioned objects of the invention, the air cleaner in accordance with the present invention comprises an outer casing made of frangible material and an inner casing made of rigid, more crash-durable material, wherein the air cleaning filter element is air tightly provided on the inside surface of the inner casing having an air outlet. When the automobile collides with other vehicles, the outer casing is collapsed and the inner casing is not damaged by the collision. Thus, the air filter element is protected and burning of the automobile due to leakage of gasoline from the float chamber of the carburetor, through a broken or bent filter and into the engine compartment is prevented.

Other objects, features and advantages of the present invention will be made apparent from the following description of the preferred embodiment of the invention taken in conjunction with the accompanying drawing in which:

FIG. 1 is a vertical sectional view showing an embodiment of the air cleaner in accordance with the present invention, and FIG. 2 is a vertical sectional view showing another embodiment of the air cleaner in accordance with the present invention.

Referring first to FIG. 1, the reference numeral 1a indicates an upper end plate and 1b indicates a lower end plate, both plates 1a and 1b being made of rigid, more crash-durable material such as iron plate and having a bent portion 1c at the inside edge thereof. The reference numeral 2 indicates an air cleaning filter element fixed between said upper end plate 1a and said lower end plate 1b by means of adhesive or the like. The reference numeral 3 indicates a protector plate having a plurality of holes 3a fixed between said filter element 2 and said bent portions 1c for preventing deformation of the air cleaning filter element 2. The reference numeral 4 indicates a lower end wall for an inner air cleaner casing provided at the inside lower part of said filter element 2. The lower inner air cleaner casing wall 4 supports the filter element 2 and is made of rigid, more crash-durable material such as iron plate so as not to be deformed at the time of collision of the automobile in which the air cleaner is mounted. An air outlet 4a is provided at the lower central portion of the bottom of the inner casing wall 4. The reference numeral 5 indicates a lower end wall and integral tubular, outer peripheral wall for an outer air cleaner casing fixed to said lower inner air cleaner casing wall 4 by means of bolt and nut 5a or the like and located at the lower outer side of said air cleaning filter element 2. The outer casing 5 is made of collapsible, i.e. frangible material such as thermoplastic resin exemplified by polyester resin and is provided with an air inlet 5b integrally fixed to the outer peripheral wall. The reference numeral 6 indicates an upper end wall or cap for an inner casing which covers the inner upper portion of said air cleaning filter element 2 and is made of rigid, crash-durable material such as iron plate. The cap 6 is provided at the center thereof with a bolt hole 6a for passing a bolt (not shown) to be fixed to said lower inner casing wall 4 therethrough. The reference numeral 7 indicates an upper end wall for an outer air cleaner casing fixed to the upper and outer portion of said air cleaning filter element 2 and to said cap 6 by means of a bolt and nut 5a or the like. The upper outer casing wall 7 is made of collapsible, i.e., frangible material such as thermoplastic resin exemplified by polyester resin so as to be collapsed at the time of collision of the automobile.

The lower inner air cleaner casing wall 4 and the cap 6 constitute an inner air cleaner construction, and the lower outer air cleaner casing 5 with its tubular, outer peripheral wall and the upper outer air cleaner casing wall 7 constitute an outer air cleaner construction. In other words, the inner casing includes an upper end wall 6, a lower end wall 4, a tubular outer peripheral wall 3 which extends between the end walls 4, 6 and sealing means 8 between each end wall and the peripheral wall 3. The annular outer casing includes the upper end wall 7, and the lower end wall and outer peripheral wall combined in the part 5 and sealed at 9.

The reference numeral 8 indicates annular filter packings for preventing the leakage of uncleaned air which has not passed through the air cleaning filter element 2 into the inner air cleaner construction. The packings 8 are provided in coaxial juxtaposition with the filter element 2 between the lower inner air cleaner casing wall 4 and the lower end plate 1b, and between the cap 6 and the upper end plate 1a. The filter packings 8 effectively prevent, together with filter element 2, the fuel from leaking out of the carburetor 10 at the time when the automobile turns sideways. The reference numeral 9 indicates a packing which prevents the then pass through the filter element, enter the inner casing, and pass out the air outlet opening;

at least part of the air cleaner outer casing, including the neck of the air inlet opening, being constructed of more frangible, less crash-durable material than is the inner casing, so that when the air cleaner is juxtaposed on an automotive carburetor for supplying filtered air thereto, and a vehicular collision is experienced, there is an enhanced likelihood that, if the air cleaner becomes physically involved, the more frangible part will be sacrificially broken and the inner casing preserved intact, lowering the prospect for fuel escaping from the carburetor and burning.

2. The automotive air cleaner of claim 1, wherein the outer peripheral wall, upper end wall and lower end wall are also made of said more frangible, less crash-durable material.

3. The automotive air cleaner of claim 2 wherein the outer casing is made of synthetic plastic material constituting said more frangible, less crash-durable material and wherein the upper end wall, lower end wall and outer peripheral wall of the inner casing is made of sheet iron.

4. The automotive air cleaner of claim 2 wherein the means securing the outer casing to the inner casing is provided by a plurality of removable nut and bolt assemblies to facilitate replacement of the more frangible, less crash-durable outer casing upon its being broken.

5. The automotive air cleaner of claim 2 wherein the sealing means of the inner casing is constituted by two annuluses of packing material, one received between the upper end wall of the inner casing and the upper end of the outer peripheral wall of the inner casing and the other received between the lower end wall of the inner casing and the lower end of the outer peripheral wall of the inner casing.

6. The automotive air cleaner of claim 5 wherein the outer peripheral wall of the inner casing includes an upper and a lower end plate which extend over the upper and lower ends of the filter element; and further including adhesive means securing these end plates to the filter element.

* * * * *